(12) United States Patent
Wool et al.

(10) Patent No.: US 6,646,033 B2
(45) Date of Patent: Nov. 11, 2003

(54) PRESSURE SENSITIVE ADHESIVES FROM PLANT OILS

(75) Inventors: Richard P. Wool, Newark, DE (US); Shana P. Bunker, DeBary, FL (US)

(73) Assignee: The University of Delaware, Newark, DE (US)

( * ) Notice: Subject to any disclaimer, the term of this patent is extended or adjusted under 35 U.S.C. 154(b) by 0 days.

(21) Appl. No.: 10/163,220

(22) Filed: Jun. 5, 2002

(65) Prior Publication Data

US 2002/0188056 A1 Dec. 12, 2002

Related U.S. Application Data

(60) Provisional application No. 60/297,197, filed on Jun. 8, 2001.

(51) Int. Cl.[7] .............................. C08K 5/42; C08K 5/41; C08K 5/06
(52) U.S. Cl. ......................... 524/157; 524/78; 524/173; 524/366; 524/556
(58) Field of Search .................... 524/78, 157, 173, 524/556, 366

(56) References Cited

U.S. PATENT DOCUMENTS

| | | | |
|---|---|---|---|
| 4,626,582 A | 12/1986 | Virnig et al. ................ | 526/298 |
| 6,001,913 A | 12/1999 | Thames et al. ............. | 524/398 |
| 6,121,398 A | 9/2000 | Wool et al. ............... | 526/238.1 |
| 6,203,720 B1 * | 3/2001 | Thames et al. ........ | 252/182.12 |

FOREIGN PATENT DOCUMENTS

| | | |
|---|---|---|
| IN | 154467 | 7/1980 |
| IN | 153599 | 6/1981 |

OTHER PUBLICATIONS

Oda, *Journal Society of Chemical Industry Japan*, vol. 41, pp. 195–197 (1938).
Swern et al., "Hydroxylation of Monounsaturated Fatty Materials with Hydrogen Peroxide", *Journal of Organic Chemistry*, vol. 67, pp. 1786–1789 (1945).
Isii, "(178~179) Hydroxylierung der Fette unde Oele, I~II", *Journal of the Society of Chemical Industry, Japan* vol. 43, No. 8, pp. 255–257.
Isii, "(259~260) Hydroxylierung des fetten Oeles, IV~V", *Journal of the Society of Chemical Industry, Japan* vol. 43, No. 11, pp. 374–379.
Isii, "(213) Hydroxylierung der fette und Oele, III", *Journal of the Society of Chemical Industry, Japan*, vol. 43, No. 10, pp. 315–317.

* cited by examiner

*Primary Examiner*—Kriellion A. Sanders
(74) *Attorney, Agent, or Firm*—Connolly Bove Lodge & Hutz LLP

(57) ABSTRACT

A Pressure Sensitive Adhesive composition having low volatile organics content and low odor that is suitable for forming pressure sensitive adhesives containing an aqueous dispersion containing a blended mixture of:

(a) a polymer obtained by the polymerization of
   (i) an internally plasticizing and cross-linkable long chain methyl ester having at least one double bond in said methyl ester chain; and
   (ii) one or more unsaturated monomers copolymerizable therewith; and (b) a surface-active agent.

27 Claims, No Drawings

PRESSURE SENSITIVE ADHESIVES FROM PLANT OILS

RELATED APPLICATIONS

This application claims benefit to provisional application No. 60/297,197 filed Jun. 8, 2001. Provisional application No. 60/297,197 is incorporated by reference in its entirety for all useful purposes.

FIELD OF THE INVENTION

This invention describes the synthesis of new bio-based monomers and the subsequent polymers that are capable of being used in the pressure sensitive adhesive (PSA) industry. The novelty in these materials is that the starting material is derived from plant oils such as high oleic soybean oil, olive oil and other oils that are capable of being chemically functionalized. In addition, this system is an odorless and organic solvent-free novel waterborne latex or emulsion based composition, which contains internally plasticizing and cross-linkable monomers. The monomer and polymer disclosed comprise a new composition of matter and a new use for known and future genetically modified plant oils.

BACKGROUND OF THE INVENTION

Pressure sensitive adhesives (PSA) are comprised of, but not limited to, polymers, tackifiers, plasticizers and stabilizers. In the past, the polymer was derived from natural rubber. Due to the difficulty in processing this material and its limited material properties, the industry shifted towards using petroleum-based long chain aliphatic monomers and polymers. Examples of the prior art polymers include, but are not limited to butyl acrylate, 2-ethylhexyl acrylate, iso-octyl acrylate and Styrene-Butadiene Rubber (SBR). These can be synthesized into polymers using emulsion, solvent, and bulk polymerization. It is ecologically advantageous for the industry to move towards aqueous emulsion based polymerizations because of the organic solvents that are required for the solution polymerization.

Replacing some, or all, of these petroleum derived raw materials with renewable plant-based raw materials is attractive, both economically and socially, as such raw materials are cheaper and their use contributes to global sustainability by not depleting scarce resources. The use of plant and animal-based raw materials such as plant oils and lard fat is further useful as such naturally occurring compounds are usually consumed readily by microorganisms. In fact, plant triglycerides are readily hydrolyzed in vivo by lipase secreting bacterial. This could make polymers derived from such raw materials easily biodegradable in natural media. This aspect of these monomers and polymers is an additional advantage over polymers derived solely from petroleum based raw materials, very few of which are degradable by naturally occurring bacteria.

The polymer in a PSA is a viscoelastic material that is permanently as well as aggressively tacky and has enough cohesive strength and elasticity to be cleanly removed from a substrate surface. These polymer systems are typically linear, or thermoplastic, and are polymers with a slight degree of cross-linking and branching. The degree of cross-linking dictates the shear and cohesive, strength of the polymer. Petroleum based polymers, as mentioned above, are typically aliphatic chains with exactly one vinyl functional group in the monomer that participates in free radical polymerization reactions. This leads to a predominately linear polymer. In order to add a controllable degree of cross-linking and branching, a multi-functional co-monomer must be added to the system to participate in the polymerization reaction.

Monomers derived from plant oils possess an inherent degree of unsaturation that varies from plant to plant. It is well known that oils from different plants such as, but not limited to, cotton, sunflower, corn, soy bean, and linseed have different amounts of carbon-carbon double bond unsaturation. The epoxidation of this unsaturation is well known. Hydrogen peroxide oxidation of triglycerides to epoxidized triglycerides has been described by R. Oda in Journal Society of Chemical Industry Japan, 41, 195-195 (1938) and by Y. Isii, in Journal Society of Chemical Industry, Japan, 43, 255–7, 315–7, 374–9 (1940), and by Swern and Billen in Journal of Organic Chemistry, 67, 1786 (1945). Ring opening reactions of epoxidized molecules are also well known. The use of diamines, anhydrides, dicarboxylic acids, and diols has been reported in literature. One of ordinary skill in the art would know that a nucleophilic species, such as those listed above, as well as an ethylenically substituted carboxylic acid, could open an oxirane structure. These reactions are relatively easy when the epoxy ring that is undergoing the reaction is in the terminal position, that is, at the end of the molecule. In epoxidized plant oils, however, the epoxy group is necessarily internal, such that is substituted on both sides by bulky akyl groups, rendering it far less reactive towards the traditional ring opening reactants. The monomers described in this disclosure use the epoxy functional group of these plant oils with an ethylenically substituted carboxylic acid, such as, but no limited to, acrylic acid. In this disclosure, the variation of unsaturation among the various plant oils, and hence the fatty acids, is used to an advantage. Depending on the property desired in the final product, various oils, or mixtures thereof, may be used in functionalization reactions to control the structural architecture of the new bio-based polymer and control its properties over a broad range of desired material response.

In the past, triglycerides and their fatty acid derivatives have been used in several different fields, including, but not limited to, inks, coatings, molding compounds, thermosetting polymers and composites. There are literature references that disclose derivatives of fatty compounds suitable in the formation of coatings. Acryloxymethyl substituted fatty compounds have been claimed to be useful in radiation curable coating formulations and as binders in ink. Acrylate esters of castor oil have been reported to have application as binders in coatings. Ethylenically unsaturated esters of long chain alkenols have been reported to have potential use as waterborne coatings, pressure sensitive adhesives, and inks. There are numerous literature references that address the use of fatty acids and fatty acid amides as components in mold releasing agents. Also, plant oil derivatives have been used to form rigid thermosetting polymer that can be used in composite applications.

However, none of these references discussed above disclose the use of plant oil derivatives, such as fatty acid esters, for the formation of pressure sensitive adhesive formulations. In addition, none of the references discussed above utilizes inexpensive and easily synthesized acrylate monomers to form latex or emulsion compositions.

The following references are disclosed as background art:

U.S. Pat. No. 4,626,582 discloses acyloxymethyl fatty compounds, which are useful as monomers in the preparation of radiation curable coatings.

U.S. Pat. No. 6,001,913 discloses latex compositions containing ethylenically unsaturated esters of long-chain alkenols which are useful as coatings, pressure sensitive adhesives, and inks.

Indian Pat. No. 153,599 describes a process for preparing novel vinyl monomers from ricinoleic acid and mixed fatty acids of castor oil.

Indian Pat. No. 154,467 describes a process for the preparation of novel acrylic monomers and polymer from castor oil and methyl ricinoleate.

U.S. Pat. No 6,121,398: High Modulus Polymers and Composites from Plant Oils.

SUMMARY OF THE INVENTION

It is an object of this invention to provide novel compositions having low organic solvents and low odor that are suitable for forming pressure sensitive adhesives. It is also an object of this invention to provide chemistries for the synthesis of monomers that can be used to form thermoplastic or thermosetting polymers, or a mixture thereof. An additional object of this invention is to provide a process for the synthesis of the novel latex or emulsion compositions. The compositions of the present invention have no precedence in the prior art.

DETAILED DESCRIPTION OF THE INVENTION

The object of this invention is to present monomers and their subsequent polymers that are derived mostly from plant and animal oil derivatives that are formulated for the use in pressure sensitive adhesives. The monomers described herein are preferably comprised of fatty acid methyl esters, derivatives of plant and animal oil triglycerides, by suitably functionalizing the fatty acid methyl ester with chemical groups that render it polymerizable. The long chain fatty acids are preferably linear carboxylic acids containing from about 4 to 30 carbon atoms, but preferably from about 14 to about 22 carbon atoms and from about 0 to 4 carbon-carbon double bonds, or preferably from about 1 to 3 carbon-carbon double bonds. As obtained in nature, these double bonds are predominately in the cis (Z) configuration and, in the case of polyunsaturated acids, not conjugated. The fatty acids derived from triglycerides include, but are not limited to the following: Lauric (C12:0), i.e., the first number in the parenthesis indicates the number of carbons and the second number in the parenthesis indicates the number of double bonds for example (C12:0) would indicate 12 carbon atoms long containing zero C=C double bonds, Myristic (C14:0), Palmitic (C16:1), Stearic (C18:0), Oleic (C18:1), Linoleic (C18:2), Linolenic (C18:3), Arachidic (C20:0), Gadoleic (C20:1), Behenic (C22:0) and Erucic (C22:1). These oils can have their fatty acid distribution function controlled or altered by several processes which include, but are not limited to, (a) genetic engineering, (b) hydrogenation (c) blending of different oils, (d) refining by temperature induced phase transitions and (e) transesterification. The C=C double bonds that constitute the unsaturation, create reactive sites that have traditionally been used for oxidative couple reactions leading to "air drying" of some plant oils. This is the chemistry of the well-known alkyd resins used for paint and varnish binders. While there are many examples of the use of drying oils for surface coating applications, the unsaturation on the fatty acid is not sufficiently reactive to allow homo- or co-polymerizations of the molecule directly to give resins with any degree of structural strength or stiffness. However, for those experienced in the art, the fatty acid molecule offers a number of reactive sites for functionalization. These include, but are not limited to, the double bond, the allylic carbons, the ester group and the carbon alpha to the ester group. The fatty acid esters, such as, but not limited to, methyl, ethyl, butyl, propyl, etc., can be obtained from the triglyceride oils by methods well known to those in the field of oil chemistry.

This invention discloses chemical reactions that use these active sites to introduce polymerizable groups on the fatty acid ester and the subsequent polymerization. These polymerizable groups include ethylenically substituted carboxylic acids. Preferred monomers of this invention are acrylate esters of fatty acid methyl esters. Preferred methods of polymerization include both conventional emulsion and mini-emulsion polymerization. All products described in this invention were characterized by the usual instrumental analysis techniques known to those of ordinary skill in the art. These techniques include, but are not limited to, nuclear magnetic resonance spectroscopy, Fourier transform infrared spectroscopy, differential scanning calorimetry, adhesives testing, and controlled strain rheological testing.

The starting material is derived from a natural resource and contains long aliphatic chains as well as variable amounts of unsaturation that depends on the source of the oil, as previously mentioned. Accordingly, this system is odorless and an organic solvent-free novel waterborne latex or emulsion based composition, which contains internally plasticizing and cross-linkable monomers. The novel monomers suitable for forming the latex or emulsion composition of this invention are ethylenically unsaturated carboxylic acid esters of long chain triglyceride derivatives. Preferred monomers of this invention are acrylated esters of fatty acid methyl esters. Accordingly, the present invention provides a composition having low volatile organic content and low odor that is suitable for forming pressure sensitive adhesives comprising an aqueous dispersion which comprises blending a mixture of:

(a) a polymer obtained by the polymerization of
 (i) an internally plasticizing and cross-linkable long chain ester having at least one double bond in said ester chain; and
 (ii) one or more unsaturated monomers copolymerizable therewith;

(b) a surface-active agent;

wherein the total weight percent of the polymer in the aqueous dispersion is at least from about 5 and not more than about 80 weight percent, wherein the monomers (i) and (ii) are present in the weight ratio ranging from about 5:1 to about 100:1.

There are several methods for introducing the ethylenically unsaturated functionalities onto the fatty acid ester. One method involves the reaction of an ethylenically unsaturated carboxylic acid with an epoxidized form of the fatty acid as described below, while another method involves the reaction of methacryloyl chloride with a hydroxylated form of the fatty acid ester.

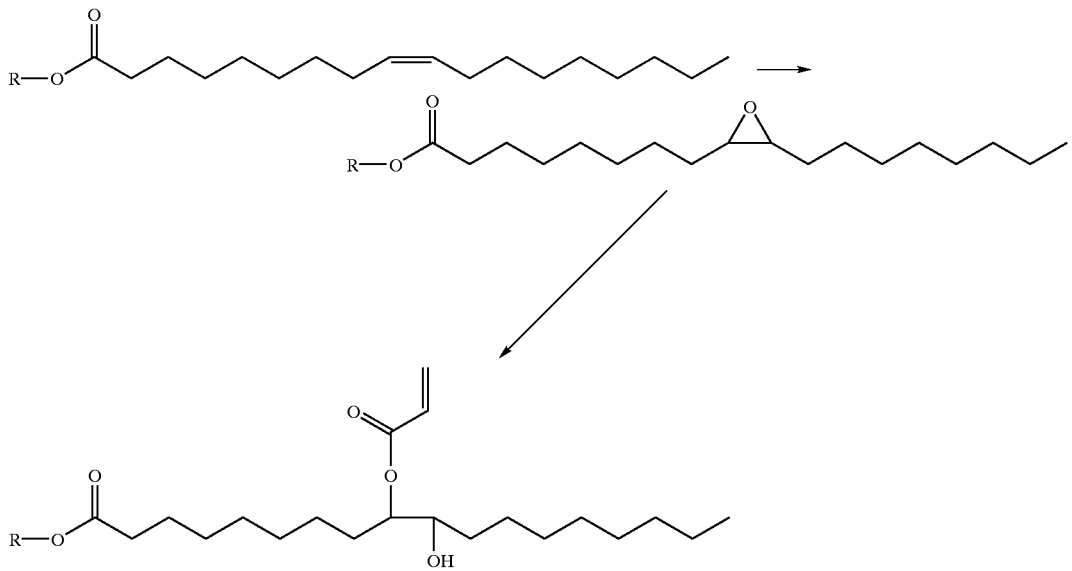

The R in the above diagram is a $C_1$–$C_{40}$ carbon containing group, preferably $C_1$–$C_{30}$ alkyl, $C_3$–$C_{30}$ cycloalkyl, or a $C_4$–$C_{30}$ aryl group and most preferably a $C_1$–$C_{10}$ alkyl chain. The former technique as shown above, utilizes an epoxy functional fatty acid ester as an intermediate. Such ester can be found naturally as part of vernonia oil, or can be synthesized via an epoxidation reaction of unsaturated fatty acid esters. Reaction of the epoxy functional with a number of ethylenically unsaturated carboxylic acids renders it polymerizable via addition polymerization. Examples of such acids include, but are not limited to, acrylic acid, methacrylic acid, and ethacrylic acid. Alternatively, a hydroxy functional fatty acid can be used as an intermediate to the ethylenically functional monomer. Such fatty acids can be found naturally as part of castor oil or can by synthesized via a hydroxylation reaction of unsaturated fatty acid esters. This hydroxylation process is disclosed in U.S. Pat. No. 6,121,398, High Modulus Polymers and Composites from Plant Oils, by Wool et al. Hydroxy containing fatty acids can also be ethylenically functionalized by reacting with unsaturated anhydrides, such as, but not limited to maleic anhydride, as described in U.S. Pat. No. 6,121,398.

In addition, a polymerizable monovinyl and/or divinyl compound is also included in the formulation. Examples of such monovinyl compounds are acrylic acid, methacrylic acid and methyl methacrylate. Examples of divinyl compounds are ethylene glycol dimethacrylate and acrylated linoleic methyl ester. The acrylated linoleic methyl ester is synthesized in the same manner as the acrylated oleic methyl ester (see Examples 1 and 2). The amount of these compounds can range generally from about 1 percent by weight to about 30 percent by weight of the fatty acid methyl ester weight, depending on the mechanical and thermal properties required or specified for the final end use.

As described below, the compositions of this invention are prepared by polymerization of monomers emulsified in water using conventional emulsion polymerization or mini-emulsion procedures. The mini-emulsion procedures require the emulsions to be homogenized using a high shear device such as a sonifier or microfluidizer to provide submicron particle size. The preferred method of homogenization in this invention is ultrasonification. Suitable surface-active agents generally known as surfactants are used for emulsifications of the monomer. Suitable surfactants include cationic, anionic and nonionic surfactants or mixture thereof. The preferred surfactant in this invention is an anionic surfactant.

Examples of useful anionic surfactants are sulfonates and organosulfates, e.g., sodium alkyl, aryl, and aralkyl sulfates and sulfonates, such as sodium 2-ethylhexyl sulfate, sodium nonyl sulfate, sodium lauryl sulfate, sodium dodecylbenzene sulfonate and sodium xylene sulfonate; higher fatty alcohols, e.g., stearyl, lauryl, etc., which have been ethoxylated and sulfonated; dialkyl esters of alkali meteal sulfosuccinic acid salts, such as sodium diamyl sulfosuccinate, and sodium dioctyl sulfosuccinate.

The amount of surfactants employed in the emulsion polymerization process will range from about 1 to about 15 weight percent, preferably about 2 to about 6 weight percent based on the total weight of monomers. The preferred surfactants are sodium lauryl sulfate and sodium dioctyl sulfosuccinate.

The above described emulsion polymerization requires the use of a water soluble initiator. Examples of common initiators are, but not limited to, potassium or ammonium persulfate, hydrogen peroxide and 2,2'-azobis(2-amidinopropane)dihydrogenchloride. Examples of partially water soluble initiators are succinic acid peroxide and t-butyl hydroperoxide. Redox systems such as persulfate with ferrous ions are also commonly used. The above described mini-emulsion polymerization requires the use of an oil soluble imitator. Examples of oil soluble initiators are substituted azonitrile compounds. The preferred water soluble initiator, 2,2'-azobis(2-amidinopropane) dihydrogenchloride, amount is in the range of about 0.1 to about 1.3 weight percent. The preferred oil soluble imitator, 2,2'-azobis(2-methylbutronitrile), amounts is in the range of about 0.1 to about 1 weight percent based on total monomer weight.

The compositions of the present invention may contain in addition to the polymeric resins referred to hereinabove, as required, suitable additives such as protective colloids, fillers, antiseptics, biocides, dispersion agents, thickening agents, tackifiers, anti-freezing agents, and pH adjusting agents.

Amounts in the following formulations are given in parts by weight. The examples illustrate representative products and are given by way of illustration only and are not to be considered as being limiting.

EXAMPLES

Example 1

Epoxidation of Fatty Acid 25 grams of oleic methyl ester, 13 grams formic acid and 20 grams of 30% hydrogen peroxide were added together. The mixture was stirred at room temperature (23° C.) for 16 hours or until spectroscopic examination showed the desired amount of the epoxy functionality. This reaction can also be applied to linoleic methyl ester. This is the intermediate monomer. Proton nuclear magnetic resonance spectroscopy indicated, with this formulation, about 0.99 epoxies were substituted onto the fatty acid methyl ester.

Example 2

Acrylation of Epoxidized Fatty Acid

The intermediate monomer, as described in Example 1, had minimal remaining unsaturation. The epoxy groups are reacted with a nucleophilic molecule, in this example, acrylic acid. 10 grams of epoxidized oleic methyl ester, 3.5 grams acrylic acid, 0.01 grams hydroquinone, and 0.1 grams AMC-2 were mixed together. Hydroquinone is an inhibitor that is used to prevent the homopolymerization of the acrylic acid during the reaction. The catalyst, AMC-2 (Aerojet Chemicals) is a combination of trivalent organic chromium complex and phthalate esters. The mixture was heated to 90° C. and stirred for 6 hours or until spectroscopic examination showed the desired degree of disappearance of the epoxy functionality and the appearance of the vinyl functional group associated with acrylic acid. Proton nuclear magnetic resonance spectroscopy indicated with this formulation there is about 0.95 acrylate groups per original double bond.

Example 3

Polymer Latex

In a small glass reactor, 2 grams of deionized water, 1 gram acrylated oleic methyl ester, (see Example 2), 0.15 gram sodium dioctyl sulfosuccinate, 0.02 gram acrylic acid and 0.003 gram 2,2'azobis(2-aminopropane) dihydrochloride were mixed together. The contents were blanketed with nitrogen gas. The contents were heated to 70° C. and stirred for 10 hours. A stable latex was formed.

Example 4

Polymer Latex-18K

In a small glass reactor, 2 grams of deionized water, 1 gram acrylated oleic methyl ester, (see example 2), 0.04 gram acrylic acid, 0.05 gram sodium lauryl sulfate and 0.003 gram 2,2'azobis(2-aminopropane)dihydrochloride were mixed together. The contents were blanketed with nitrogen gas. The contents were heated to 65° C. and stirred for 9 hours. The product is a stable latex. The weight average molecular weight was approximately 113,000 g/mole, as determined by gel permeation chromatography and multi-angle light scattering,. The number average molecular weight was found to be about 18,000 g/mole.

Example 5

Polymer Latex-250K

In a small glass reactor, the following were mixed together: 2 grams of deionized water, 1 gram acrylated oleic methyl ester, (see example 2), 0.03 gram acrylic acid, 0.15 gram sodium dioctyl sulfosuccinate and 0.003 gram 2,2'azobis(2-amidinopropane)dihydrochloride. The contents were blanketed with nitrogen gas. The contents were heated to 70° C. and stirred for 12 hours. The product is a stable latex. The weight average molecular weight, as determined by gel permeation chromatography and multiangle light scattering, was approximately 1,000,000 g/mole. The number average molecular weight was found to be 250,000 g/mole. The glass transition temperature $T_g$, was found to be about −40° C.

Example 6

Polymer Latex-linear and Branched Polymer

In a glass reactor, 10 grams of deionized water, 5 gram acrylated oleic methyl ester, (see example 2), 0.12 gram acrylic acid, 0.75 gram sodium dioctyl sulfosuccinate and 0.0153 gram 2,2'azobis(2-amidinopropane)dihydrochloride were mixed. The contents were blanketed with nitrogen gas and heated to 70° C. and stirred for 18 hours. The product was a stable latex. A uniform film of approximately 80 μm on Mylar was formed. The adhesive film had a peel strength 400 J/m². The storage modulus at room temperature was 20 MPa.

Example 7

Polymer Latex-crosslinked EGDM

In a glass reactor, 20 grams of dionized water, 10 grams acrylated oleic methyl ester (see example 2), 0.2 grams ethylene glycol dimethacrylate, 1.5 gram sodium dioctyl sulfosuccinate and 0.03 gram 2,2'azobis(2-amidinopropane) dihydrochloride were mixed. The contents were blanketed with nitrogen gas, heated to 70° C. and stirred for 18 hours. The product was a stable latex. A uniform film of approximately 80 μm on Mylar was formed. The adhesive film had a peel strength 230 J/m². The storage modulus at room temperature was 26, MPa.

Example 8

Polymer Latex-crosslinked ALM

In a glass reactor, 20 grams of dionized water, 10 grams acrylated oleic methyl ester (see example 2), 0.8 grams acrylated linoleic methyl ester (see example 2), 1.5 gram sodium dioctyl sulfosuccinate and 0.03 gram 2,2'azobis(2-amidinopropane)dihydrochloride were mixed. The contents were blanketed with nitrogen gas and heated to 70° C. and stirred for 18 hours. The product was a stable latex. A uniform film of approximately 80 μm on Mylar was formed. The adhesive film had a peel strength 280 J/m². The storage modulus at room temperature was 21 MPa.

Example 9

Mini-emulsion Polymer Latex

In a glass reactor, 40 grams of dionized water, 9 grams acrylated oleic methyl ester (see example 2), 1 gram methyl methacrylate, 1.3 gram of 15 wt % aqueous solution of sodium lauryl sulfate, and 0.05 gram 2,2'azobis(2-methylbutzronitrile) were mixed and subjected to 5 minutes of continuous ultrasonification. The contents were blanketed with nitrogen gas and heated to 85° C. and stirred for 6 hours. The product was a stable latex with a particle size of 350 nm. The glass transition temperature was −53° C. A uniform film of approximately 80 μm on Mylar was formed. The adhesive film had a peel strength of 360 J/m². A tack value of 58 J/m² to a polyethylene probe and a value of 75 J/m² to a stainless steel probe were obtained. The storage modulus at room temperature was 9.7 MPa.

Example 10

Mini-emulsion Polymer Latex-crosslinked EGDM

In a glass reactor, 40 grams of dionized water, 9 grams acrylated oleic methyl ester (see example 2), 0.95 gram methyl methacrylate, 0.05 gram ethylene glycol dimethacrylate, 1.3 gram of 15 wt % aqueous solution of sodium lauryl sulfate, and 0.05 gram 2,2'azobis(2-methylbutzronitrile) were mixed and subjected to 5 minutes of continuous ultrasonification. The contents were blanketed with nitrogen gas. The contents were heated to 85° C. and stirred for 6 hours. The product was a stable latex with a particle size of 390 nm. The glass transition temperature was −50° C. A uniform film of approximately 80 μm on Mylar was formed. The adhesive film had a peel strength 80 J/m². A shear time to failure of 21 hours was recorded, using a 500 gram weight and 1"×1" testing area. The storage modulus at room temperature was 14 MPa.

Example 11

Mini-emulsion Polymer Latex-crosslinked EGDM

In a glass reactor, 40 grams of dionized water, 8.9 grams acrylated oleic methyl ester (see example 2), 1.0 gram methyl methacrylate, 0.1 gram ethylene glycol dimethacrylate, 1.3 gram of 15 wt % aqueous solution of sodium lauryl sulfate, and 0.05 gram 2,2'azobis(2-methylbutzronitrile) were mixed and subjected to 5 minutes of continuous ultrasonification. The contents were blanketed with nitrogen gas. The contents were heated to 85° C. and stirred for 6 hours. The product was a stable latex with a particle size of 400 nm. The glass transition temperature was −46° C. A uniform film of approximately 80 μm on Mylar was formed. The adhesive film had a peel strength 24 J/m². A shear time to failure of over 120 hours was recorded, using a 500 gram weight and 1"×1" testing area. The storage modulus at room temperature was 60 MPa.

Example 12

Mini-emulsion Polymer Latex-crosslinked ALM

In a glass reactor, 40 grams of dionized water, 7.8 grams acrylated oleic methyl ester (see example 2), 1.0 gram methyl methacrylate, 1.2 gram acrylated linoleic methyl ester (see example 2), 1.3 gram of 15 wt % aqueous solution of sodium lauryl sulfate, and 0.05 gram 2,2'azobis(2-methylbutzronitrile) were mixed and subjected to 5 minutes of continuous ultrasonification. The contents were blanketed with nitrogen gas. The contents were heated to 85° C. and stirred for 6 hours. The product was a stable latex with a particle size of 500 nm. The glass transition temperature was −48° C. A uniform film of approximately 80 μm on Mylar was formed. The adhesive film had a peel strength 12 J/m². A shear time to failure of over 120 hours was recorded, using a 500 gram weight and 1"×1" testing area. The storage modulus at room temperature was 40 MPa.

All the references cited above are incorporated by reference in their entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

We claim:

1. A pressure sensitive adhesive composition which comprises an aqueous dispersion comprising a blended mixture of:
    (a) a polymer obtained by the polymerization of
        (i) an internally plasticizing and cross-linkable long chain alkyl ester having one double bond located in said long chain alkyl ester; and
        (ii) one or more unsaturated monomers copolymerizable therewith wherein said one or more unsaturated monomers bond at the double bond location in said akyl ester;
    (b) a surface-active agent.

2. The composition as claimed in claim 1, wherein the total weight percent of the polymer in the aqueous dispersion is from about 5 to about 80 weight percent, and said monomers (i) and (ii) are present in the weight ratio ranging from about 10:1 to 100:1.

3. The composition as claimed in claim 1, wherein said long chain alkyl ester is a fatty acid methyl ester derived from plant oil, fatty acid methyl ester derived from animal oil, fatty acid ethyl ester derived from plant oil, fatty acid ethyl ester derived from animal oil, fatty acid propyl ester derived from plant oil, fatty acid propyl ester derived from animal oil, fatty acid butyl ester derived from plant oil or fatty acid butyl ester derived from animal oil.

4. The composition as claimed in claim 1, wherein said alkyl ester is a fatty acid methyl ester.

5. The composition as claimed in claim 1, wherein said copolymerizable monomer is a compound having at least one double bond in the molecule.

6. The compound as claimed in claim 5, wherein said compound having at least one double bond in the molecule is acrylic acid.

7. The composition as claimed in claim 5, wherein said copolymerizable monomer is present in an amount ranging from about 1 to about 10 weight percent based on the total weight of the composition.

8. The composition as claimed in claim 1, wherein said surface-active agent is an anionic, cationic, or nonionic surfactant.

9. The composition as claimed in claim 1, wherein the composition has a total solids content, including said polymer, of from about 20 to about 70 percent by weight based on the total weight of said aqueous dispersion.

10. A process to make a pressure sensitive adhesive composition, which comprises mixing
    (a) a polymer obtained by the polymerization of
        (i) an internally plasticizing and cross-linkable long chain alkyl ester having one double bond located in said long chain alkyl ester; and
        (ii) one or more unsaturated monomers copolymerizable therewith wherein said one or more unsaturated monomers bond at the double bond location in said akyl ester;
    (b) a surface-active agent.

11. The process as claimed in claim 10, wherein the total weight percent of the polymer in the aqueous dispersion is from about 5 to about 80 weight percent, and said monomers (i) and (ii) are present in the weight ratio ranging from about 10:1 to 100:1.

12. The process as claimed in claim 10, wherein said long chain alkyl ester is a fatty acid methyl ester derived from plant oil, fatty acid methyl ester derived from animal oil, fatty acid ethyl ester derived from plant oil, fatty acid ethyl ester derived from animal oil, fatty acid propyl ester derived from plant oil, fatty acid propyl ester derived from animal oil, fatty acid butyl ester derived from plant oil or fatty acid butyl ester derived from animal oil.

13. The process as claimed in claim 10, wherein said long chain alkyl ester is a fatty acid methyl ester derived from plant oil.

14. The process as claimed in claim 10, wherein said copolymerizable monomer is a compound having at least one unsaturated double bond in the molecule.

15. The process as claimed in claim 13, wherein said compound having at least one unsaturated double bond in the molecule is acrylic acid.

16. The process as claimed in claim 13, wherein said copolymerizable monomer is present in an amount ranging from about 1 to about 10 weight percent based on the total weight of the composition.

17. The process as claimed in claim 10, wherein said surface-active agent is an anionic, cationic, or nonionic surfactant.

18. The process as claimed in claim 17, wherein said surface-active agent is sulfonate, organosulfate, sulfonate, fatty alcohol, fatty alcohol which has been ethoxylated and sulfonated and dialkyl ester of alkali metal sulfosuccinic acid salt.

19. The process as claimed in claim 10, wherein said surface-active agent is sodium lauryl sulfate or sodium dioctyl sulfosuccinate.

20. The process as claimed in claim 19, wherein said surface-active agent is employed in the emulsion polymerization process in an amount from about 1 to about 15 weight percent based on the total weight of monomers.

21. The process as claimed in claim 10, wherein said surface-active agent is employed in the emulsion polymerization process in an amount from about 2 to about 6 weight percent based on the total weight of monomers.

22. The process as claimed in claim 10, wherein the composition has a total solids content including said polymer is from about 20 to about 70 percent by weight based on the total weight of said aqueous dispersion.

23. The process as claimed in claim 10, which further comprises an initiator.

24. The process as claimed in claim 23, wherein said initiator is potassium persulfate, ammonium persulfate, hydrogen peroxide, 2,2'-azobis(2-amidinopropane) dihydrogenchloride, succinic acid peroxide, t-butyl hydroperoxide or an azonitrile containing compound.

25. The process as claimed in claim 23, wherein said initiator is 2,2'-azobis(2-amidinopropane) dihydrogenchloride and is present in an amount from about 0.1 to about 1.3 weight percent.

26. The process as claimed in claim 23, wherein said initiator is 2,2'-azobis(2-methylbutronitrile) and is present in an amount from about 0.1 to about 1 weight percent based on total monomer weight.

27. The process as claimed in claim 10, which further comprises one or more additives selected from the group consisting of protective colloids, fillers, antiseptics, biocides, dispersion agents, thickening agents, anti-freezing agents, and pH adjusting agents.

* * * * *